(12) United States Patent
Matsuzaki et al.

(10) Patent No.: US 7,442,147 B2
(45) Date of Patent: Oct. 28, 2008

(54) VEHICLE CONTROL SYSTEM

(75) Inventors: Haruki Matsuzaki, Obu (JP);
Tomoyuki Kashiwagi, Chita-gun (JP);
Masaaki Shinojima, Chiryu (JP);
Masashi Hori, Anjo (JP)

(73) Assignees: Denso Corporation (JP); Nippon Soken, Inc. (JP)

( * ) Notice: Subject to any disclaimer, the term of this patent is extended or adjusted under 35 U.S.C. 154(b) by 353 days.

(21) Appl. No.: 11/471,607

(22) Filed: Jun. 21, 2006

(65) Prior Publication Data

US 2007/0087896 A1    Apr. 19, 2007

(30) Foreign Application Priority Data

Jun. 28, 2005  (JP) .............................. 2005-188282

(51) Int. Cl.
*B60W 10/04* (2006.01)
*F16H 59/00* (2006.01)

(52) U.S. Cl. ......................................... 477/107; 74/335

(58) Field of Classification Search .................. 74/335, 74/473.12, 473.11; 477/107
See application file for complete search history.

(56) References Cited

U.S. PATENT DOCUMENTS 6,105,448 A    8/2000  Borschert et al.
6,230,576 B1   5/2001  Yamada et al.
2005/0160849 A1  7/2005  Kozu et al.

FOREIGN PATENT DOCUMENTS

| JP | 2002-323127 | 11/2002 |
|---|---|---|
| JP | 2002-349702 | 12/2002 |
| JP | 2005-090575 | 7/2005 |

OTHER PUBLICATIONS

German Official Action dated Feb. 15, 2008, issued in corresponding German Application No. 10 2006 029 813.6 with English translation.

*Primary Examiner*—Dirk Wright
(74) *Attorney, Agent, or Firm*—Nixon & Vanderhye PC

(57) ABSTRACT

A controller determines the state of the range detector on the basis of the detection signals detected by the range detector, then when the range detector is determined to be in an abnormal condition, the controller moves the shift-changing valve until the movement is inhibited by the restriction member, thereby establishes the position of one end, and controls the actuator with respect to the established one end position and on the basis of the amount of operation to move the shift-changing valve to the position corresponding to an instructed shift range. Even when the range detector is in an abnormal condition, it is possible to make a change to the shift range corresponding to a shift range changing command.

13 Claims, 8 Drawing Sheets

VEHICLE CONTROL SYSTEM

CROSS-REFERENCE TO RELATED APPLICATION

This application is based on Japanese Patent Application No. 2005-188282 filed on Jun. 28, 2005, the disclosure of which is incorporated herein by reference.

FIELD OF THE INVENTION

The present invention relates to a vehicle control system provided with a shift-by-wire system.

BACKGROUND OF THE INVENTION

JP-2000-170905A (U.S. Pat No. 6,230,576) shows a shift-by-wire system of an auto-transmission. In this system, a shift range selected by a vehicle occupant is detected, and a shift-changing valve for changing the shift range in an automatic transmission is actuated by an actuator such as an electric motor in accordance with the detected shift range.

The shift-by-wire system is provided with a range detector. When a change of the shift range is instructed, an electric current is supplied to an electric motor until an actual shift range detected by the shift range detector becomes coincident with the instructed shift range. According to such a system, however, upon occurrence of a trouble of the range detector such as, for example, failure of the range detector itself, disconnection of a harness for connection between the range detector and a controller in the shift-by-wire system, or a short-circuit of the harness, it becomes no longer possible to detect an actual shift range and hence impossible to make switching to the instructed shift range.

SUMMARY OF THE INVENTION

The present invention has been accomplished in view of the above-mentioned problems and it is an object of the invention to provide a vehicle control system able to make switching to an instructed shift range even upon occurrence of a trouble in a shift detector.

According to the present invention, when a trouble of the range detector is detected, a shift-changing valve is moved until the movement is restricted by a restriction member, whereby the position of one end in a reciprocative movement range of the shift-changing valve can be defined. In the present invention, the amount of operation of an actuator performed when moving the shift-changing valve from a position corresponding to a certain shift range to a position corresponding to another shift range is stored in a memory for each shift range interval. Therefore, when it is possible to define the position of one end in the reciprocative movement range, the shift-changing valve can be moved to the position corresponding to an instructed shift range by operating the actuator until the amount of operation thereof becomes coincident with that stored in the memory on the basis of the established position. Thus, even upon occurrence of a trouble in the range detector, it is possible to make switching to a shift range instructed by a shift range changing command.

DETAILED DESCRIPTION OF THE PREFERRED EMBODIMENTS

Embodiments of the present invention will be described in detail hereinunder with reference to the accompanying drawings. In the following description, "electronic control unit" will be abbreviated "ECU."

First Embodiment

Figure 2:
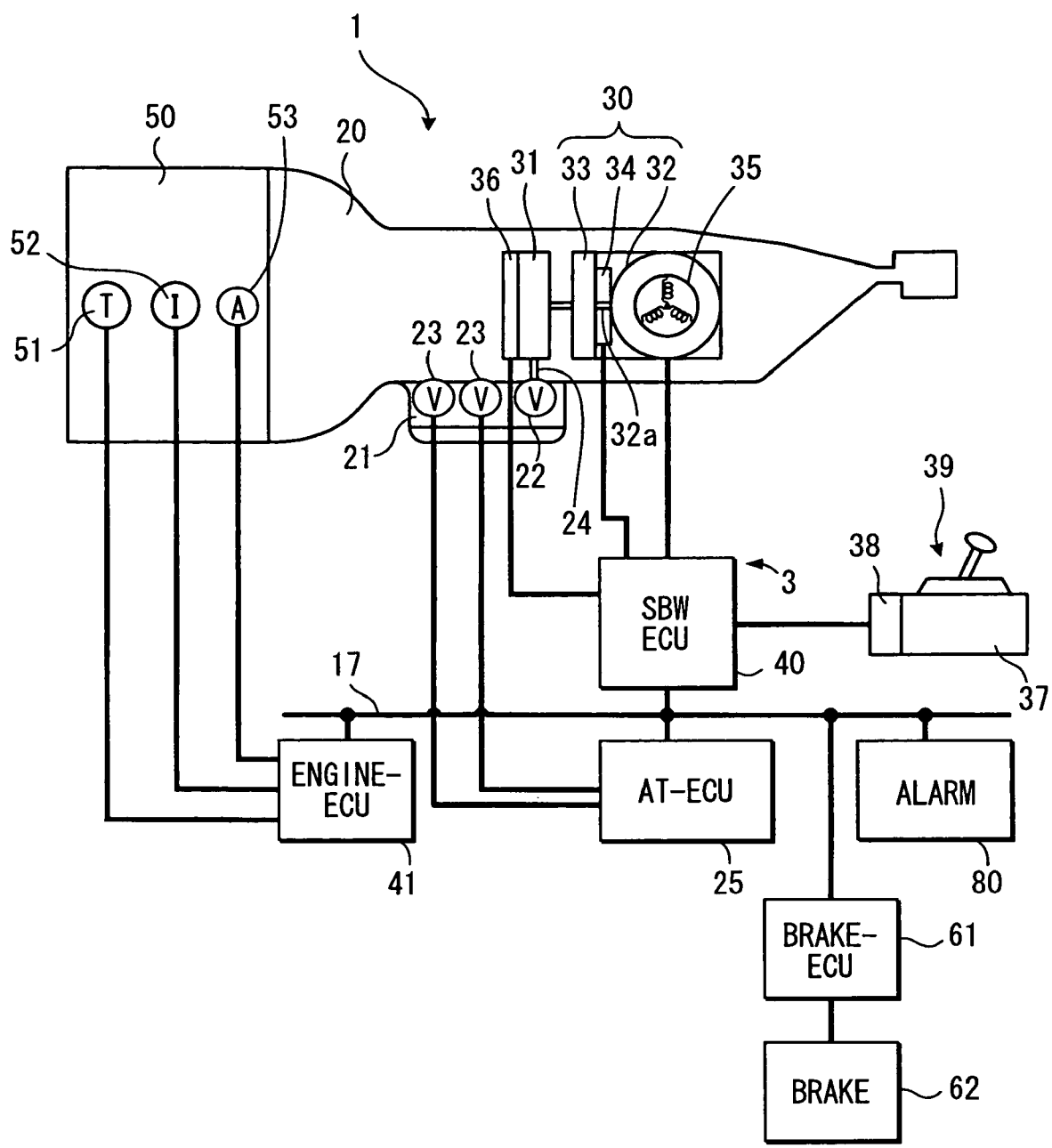
FIG. 2 is a schematic diagram of a vehicle system related to the first embodiment.

FIG. 2 is a schematic diagram showing a vehicle system 1 using a vehicle control system according to a first embodiment of the present invention. A shift-by-wire system 3 as the vehicle control system is a system for controlling the travel of a vehicle and it is connected electrically or optically through an interior LAN line 17 to an automatic transmission controlling ECU (hereinafter referred to as "AT controlling ECU") 25, an engine controlling ECU 41, a brake controlling ECU 61, and an alarm device 80. A detent plate 72 (see FIG. 3) as a rotating member is engaged with a shift range switching valve 24 (see FIG. 3) of an automatic transmission 20, whereby the shift-by-wire system 3 is connected mechanically to the automatic transmission 20. To the shift-by-wire system 3 is connected a shift range selector 39 which outputs a shift range changing command to the shift-by-wire system 3, the shift range changing command instructing a change to an instructed shift range selected by a vehicle occupant. The shift range selector 39 may be connected to the AT controlling ECU 25 and the AT controlling ECU 25 may output a shift range changing command to the shift-by-wire system 3.

The automatic transmission 20 includes plural frictional engaging elements (not shown) for engagement in any shift range, plural electromagnetic valves 23 for controlling the pressure of oil to be outputted to the frictional engaging elements, and a manual valve 22. In the manual valve 22 is provided a manual valve 24 as a shift-changing valve so as to be movable reciprocatively. As the manual valve 24 moves in its reciprocating direction, the pressure of oil applied to an oil path in the automatic transmission 20 changes in accordance with the moved position of the manual valve 24, so that the shift range of the automatic transmission 20 changes. In the automatic transmission 20 there are provided drive range (D) and reverse range (R) as travel ranges and parking range (P) and neutral range (N) as non-travel ranges. The shift-by-wire system 3 causes the manual valve 24 to move to the position instructed by a shift range changing command, whereby a change is made to the shift range instructed by the shift range changing command. In the automatic transmission 20 there is adopted a construction wherein N-range is realized by changing the state of engagement of the frictional engaging elements on the basis the pressure of oil outputted from each electromagnetic valve 23 without depending on the position of the manual valve 24.

The AT controlling ECU 25 as an automatic transmission controller is an electronic circuit constructed mainly by a microcomputer. The AT controlling ECU 25 controls each electromagnetic valve 23 electrically to increase or decrease the outputted oil pressure to be applied to the frictional engaging elements, thereby switching engagement and release of the frictional engaging elements from one to the other. As a result, the shift range of the automatic transmission 20 changes from one shift range to another. Further, the AT controlling ECU 25 realizes N-range by controlling the pressure of oil outputted from each electromagnetic valve 23 without depending on the position of the manual valve 24. In the following description, the control for realizing a neutral state, i.e., N-range, by controlling each electromagnetic valve 23 without depending on the position of the manual valve 24 will be designated "N-range control."

The engine controlling ECU 41 as an engine controller is an electronic circuit constructed mainly by a microcomputer. A throttle device 51 for adjusting the throttle opening in an intake passage of an engine 50, a fuel injection valve 52 for adjusting the amount of fuel to be injected to an intake pipe or a cylinder in the engine 50, and an accelerator device 53 which outputs a signal indicative of the amount of operation of an accelerator pedal in a vehicle to the engine controlling ECU 41, are connected electrically to the engine controlling ECU 41. The engine controlling ECU 41 controls the throttle device 51 and the fuel injection valve 52 electrically in accordance with operation of an accelerator pedal performed by the vehicle occupant and thereby adjusts the engine torque. The engine controlling ECU 41 also has an automatic control function of controlling the throttle device 51 and the fuel injection valve 52 without depending on operation of the accelerator pedal.

The brake controlling ECU 61 as a brake controller is constructed mainly by a microcomputer. A brake-actuating device 62 is connected to the brake controlling ECU 61. The brake actuating device 62 is connected to a vehicular brake mechanically or electrically and the brake controlling ECU 61 controls the brake actuating device 62 in accordance with operation of a brake pedal performed by the vehicle occupant, thereby causing the vehicular brake to operate. The brake controlling ECU 61 also has an automatic control function of controlling the brake-actuating device 62 electrically and thereby actuating the brake without depending on operation of the brake pedal.

The shift-by-wire system 3 includes a shift-by-wire controlling ECU ("SBW controlling ECU" hereinafter) 40, an actuator 30, a conversion mechanism 31, a rotational angle sensor 34, and a shift range sensor 36 as a range detector.

The SBW controlling ECU 40 as a controller is an electronic circuit constructed mainly by a microcomputer. The actuator 30, rotational angle sensor 34, shift range sensor 36, and shift range selector 39, are connected to the SBW controlling ECU 40. The SBW controlling ECU 40 includes a memory as a storage device. The amount of operation of the actuator 30 performed when moving the manual valve 24 from a position corresponding to a certain shift range to a position corresponding to another shift range is stored in the memory for each shift range-to-shift range interval. When the state of the shift range sensor 36 is normal, the SBW controlling ECU 40 controls the actuator 30 while making reference to a detection signal detected by the shift range sensor 36, thereby realizing an instructed shift range. When it has become impossible to make reference to a detection signal provided from the shift range sensor 36 due to the occurrence of a trouble in the shift range sensor 36, the SBW controlling ECU 40 controls the actuator 30 in accordance with the amount of operation for each shift range stored in the memory, thereby realizing an instructed shift range.

The actuator 30 includes an electric motor 32 and a reduction mechanism 33. The electric motor 32 includes a rotor (not shown), an output shaft 32a provided centrally of the rotor, and a drive section 35 comprising plural coils arranged in the rotating direction and connected together. The drive section 35 is connected electrically to the SBW controlling ECU 40 and produces a rotational driving force of the rotor when an electric current is supplied to the drive section 35. The reduction mechanism 33 increases the rotational driving force of the output shaft 32a of the electric motor 32 and outputs the increased driving force to the conversion mechanism 31.

The rotational angle sensor 34 is provided on the output shaft 32a of the electric motor 32. For example, the rotational angle sensor 34 is a rotary encoder which outputs a pulse signal at every rotation by a predetermined angle of the output shaft 32a. The SBW controlling ECU 40 counts pulse signals outputted from the rotational angle sensor 34 to determine a rotational angle of the output shaft 32a.

Reference will now be made to a more concrete example of the foregoing amount of operation stored in the memory. The amount of operation indicates, in more particular terms, a relative rotational angle of the output shaft 32a at the time of moving the manual valve 24 from the position corresponding to a certain shift range to the position corresponding to another shift range adjacent thereto. The memory stores the relative rotational angle as the amount of operation in terms of the number of pulse signals outputted from the rotary encoder. The amount of operation may be stored in terms of information other than the relative rotational angle. For example, the amount of operation may be stored in terms of an energization time necessary for rotation corresponding to the relational rotational angle.

The conversion mechanism 31 converts the rotational driving force outputted from the reduction mechanism 33 into a linear driving force, causing the manual valve 24 to move in the axial direction. The details of the conversion mechanism 31 will be described below.

Figure 3:
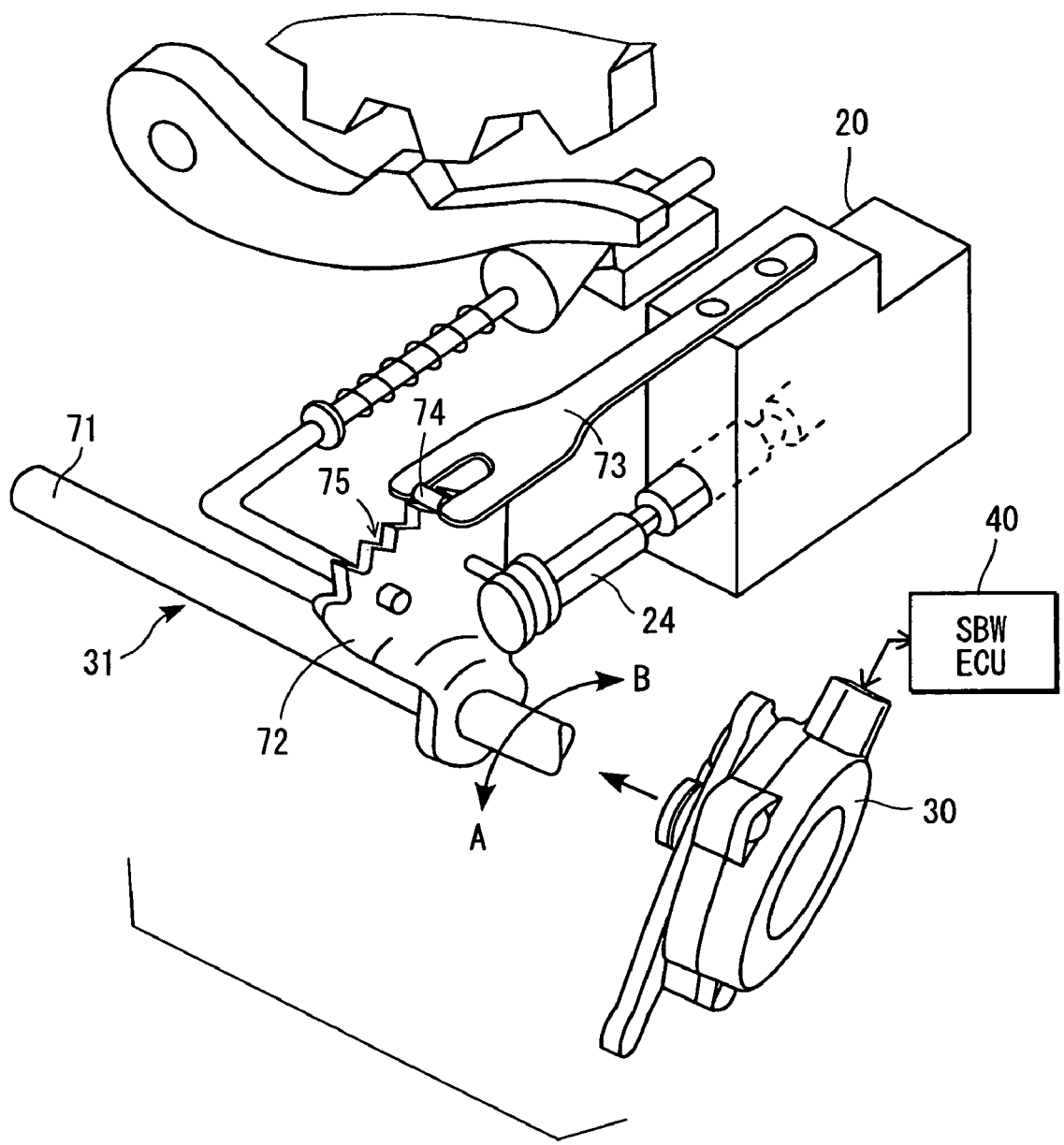
FIG. 3 is a schematic diagram of a conversion mechanism related to the first embodiment.

FIG. 3 is a schematic diagram of the conversion mechanism 31. The conversion mechanism 31 includes a control rod 71, a detent plate 72, a detent spring 73, and a roller 74. The control rod 71 is disposed in an attitude orthogonal to the axis of the manual valve 24 and one axial end thereof is connected to the reduction mechanism 33. The detent plate 72 is fixed to the control rod 71 and is adapted to rotate together with the control rod. The detent spring 73 is a plate spring and is cantilevered by a predetermined fixing portion. The detent spring 73 urges the roller 74 toward the detent plate 72. The roller 74 as a restriction member is attached to the tip of the detent spring 73. The manual valve 24 is engaged with the detent plate 72 and reciprocates axially as the detent plate 72 rotates reciprocatively. The detent plate 72 is a generally arcuate plate-like member, with plural recesses 75 being formed in the arcuate outer periphery portion of the detent plate 72. The plural recesses 75 are formed in positions corresponding to the shift ranges of the automatic transmission 20. When the manual valve 24 moves to a specific position, the shift range of the automatic transmission 20 changes to the shift range corresponding to the specific position. At this time, the recess 75 corresponding to the shift range concerned and the roller 74 are engaged with each other. Upon the mutual engagement of the recess 75 and the roller 74, the rotation of the detent plate 72 is inhibited and the manual valve 24 occupies the aforesaid specific position. The details of the detent plate 72 will be described below with reference to FIG. 5.

Figure 5:
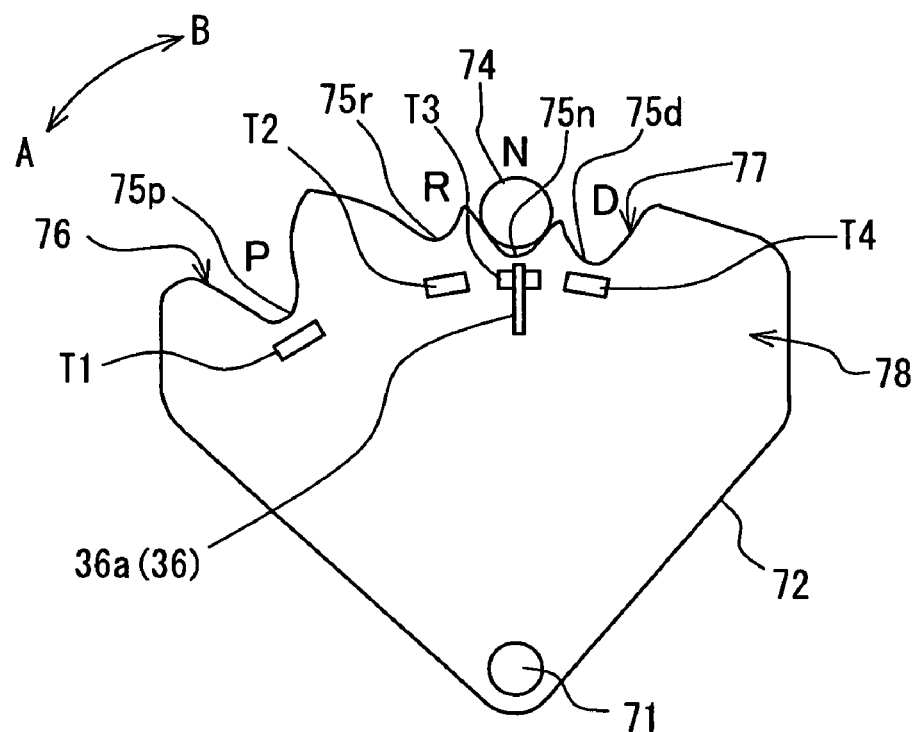
FIG. 5 is a schematic diagram of a rotating member related to the first embodiment.

FIG. 5 is a more detailed schematic diagram of the detent plate 72. As shown in the same figure, plural recesses 75$p$, 75$r$, 75$n$, and 75$d$, formed in the detent plate 72 correspond to P, R, N, and D-ranges, respectively, from the left side. When any of the recesses 75 and the roller 74 are put in engagement with each other and when the rotational driving force of the electric motor 32 is not exerted on the detent plate 72, the roller 74 comes into abutment against the wall of the recess 75, whereby the rotation of the detent plate 72 is inhibited. When the rotational driving force of the electric motor 32 acts on the detent plate 72, the roller 74 gets over the wall of the recess 75 and the detent plate 72 rotates.

However, a wall ("P-wall" hereinafter) 76 located on the left side of the recess 75$p$ corresponding to P-range and a wall ("D-wall" hereinafter) 77 located on the right side of the recess 75$d$ corresponding of D-range are each formed in such a shape as makes the roller 74 unable to get thereover even when the rotational driving force of the electric motor 32 acts on the detent plate 72. Therefore, when the detent plate 72 is rotated in direction B in FIG. 5, the roller 74 comes into abutment against the P-wall to inhibit rotation of the detent plate 72, whereby the movement of the manual valve 24 is inhibited at one end of the reciprocative movement range. The P-range is realized when the manual valve 24 moves to one end of the reciprocative movement range. Once the P-range can be realized, the output shaft 32$a$ of the electric motor 32 is rotated by an amount corresponding to the relative rotational angle necessary for switching from the P-range to an instructed shift range, whereby it is possible to realize any instructed shift range without making reference to the detection signal detected by the shift range sensor 36. This is also the case with D-range. By abutting the roller 74 against the D-wall 77 to realize the D-range, it is possible to realize any instructed shift range. The position where the manual valve 24 realizes the D-range corresponds to "the other end of the reciprocative movement range".

The shift range sensor 36 shown in FIG. 2 detects an actual shift range on the basis of, for example, a rotational angle of an output shaft of the reduction mechanism 33 or of the detent plate 72 in the conversion mechanism or a moved position of the manual valve 24 and outputs a detection signal indicative of the detected shift range (actual shift range) to the SBW controlling ECU 40. Reference will here be made to an example of the shift range sensor 36 which detects the actual shift range on the basis of a rotational angle of the detent plate 72. As shown in FIG. 5, on one end face 78 in the thickness direction of the detent plate 72 there are provided plural shift range terminals T1, T2, T3, and T4, in the rotating direction of the detent plate 72. Further, a contact terminal 36$a$ is provided on a straight line joining the roller 74 and the control rod 71. The contact terminal 36$a$ is spaced away from the detent plate 72. The shift range sensor 36 is constructed such that the terminals T1, T2, T3, and T4, rotate together with the detent plate 72 and come into contact with the contact terminal 36$a$ successively. When the detent plate 72 rotates in both directions of arrows "A" and "B" in FIG. 5 with rotation of the electric motor 32, the contact terminal 36$a$ comes into conduction with any of the shift range terminals T1, T2, T3, and T4, depending on a rotational position of the detent plate 72. Detection signals are outputted from the shift range terminals to the SBW controlling ECU 40. In this case, the detection signal provided from the conducting shift range terminal turns ON, while the detection signals provided from the non-conducting shift range terminals turn OFF. The SBW controlling ECU 40 determines an actual shift range on the basis of which detection signal is ON.

Next, the following description is provided about the shift range selector 39 shown in FIG. 2.

The shift range selector 39 includes a lever type or button type operating section 37 for the vehicle occupant to select a shift range and a selector sensor 38 for detecting the selected shift range. The selector sensor 38 outputs a shift range changing command to the SBW controlling ECU 40, the shift range changing command instructing a change to the detected shift range upon detection of the shift range.

The alarm device 80 is connected to the interior LAN line 17 electrically or optically. The alarm device 80 receives a command from another electrical unit connected to the interior LAN line 17 and notifies the vehicle occupant of a predetermined vehicular condition in accordance with the command. The announcement of the vehicular condition may be done, for example, by display on the vehicular instrument panel, or by emitting a voice from a speaker of the vehicle, or by both such display and voice.

Next, the following description is provided about a processing for changing the shift range of the automatic transmission 20 performed by the SBW controlling ECU 40.

Figure 4:
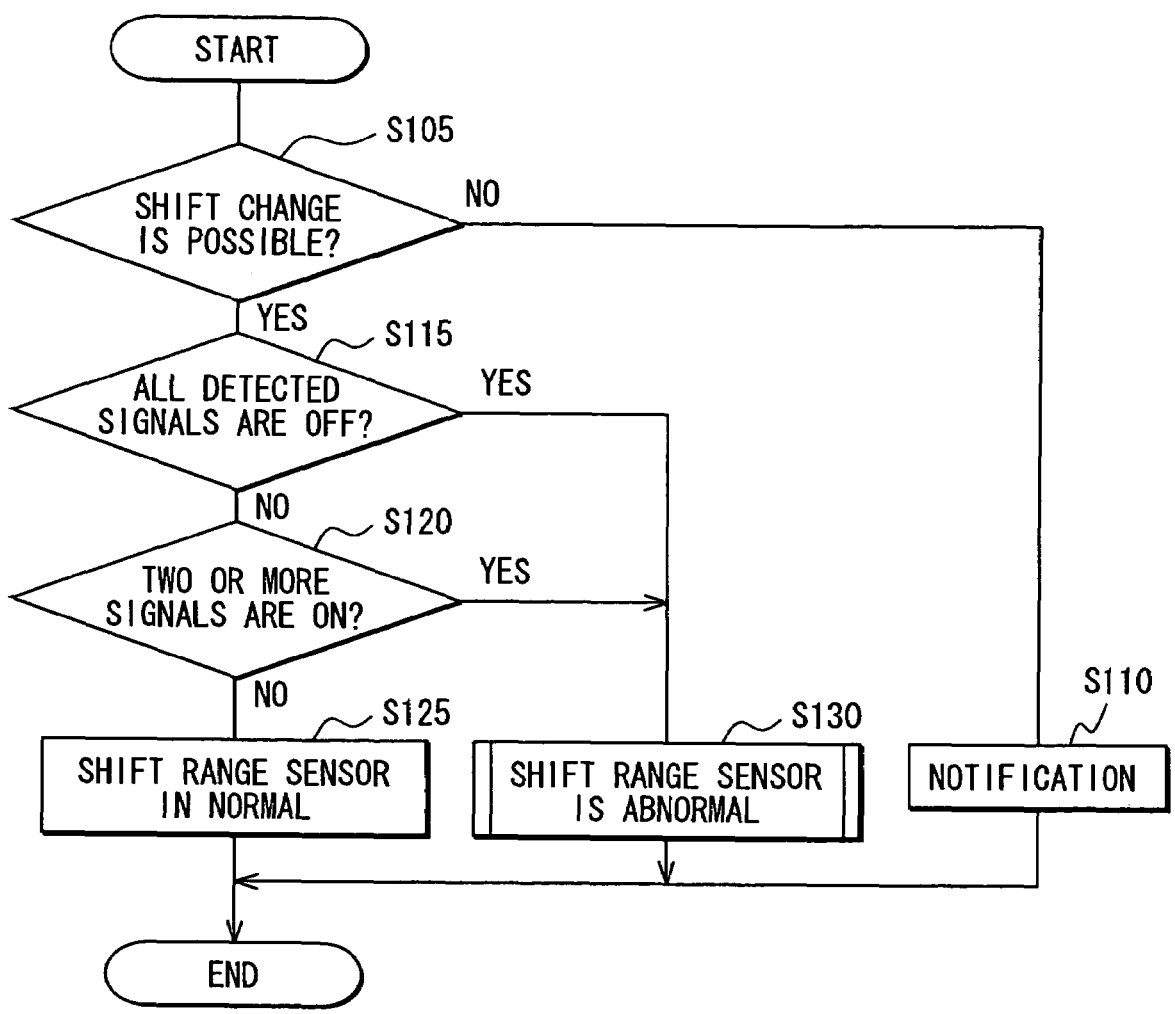
FIG. 4 is a flow chart related to the first embodiment.

FIG. 4 is a flow chart showing in what flow the processing for changing the shift range of the automatic transmission 20 is performed by the SBW controlling ECU 40. This processing is executed upon output of a shift range changing command from the shift range selector 39.

In Step S105, the SBW controlling ECU 40 determines whether it is possible or not to make a change of the shift range. More specifically, on the basis of detection signals of, for example, vehicle speed and brake condition, the SBW controlling ECU 40 determines whether the vehicle is at a standstill and the brake thereof is in operation. When the answer is affirmative, the SBW controlling ECU 40 determines that it is possible to make a change of the shift range. When the answer is negative, the SBW controlling ECU 40 determines that it is impossible to make a change of the shift range. When it is possible to change the shift range, the SBW controlling ECU 40 advances the processing to Step S115, while when it is impossible to change the shift range, the SBW controlling ECU 40 advances the processing to Step S110.

In Step S115, the SBW controlling ECU 40 controls the alarm device 80 to notify the vehicle occupant that it is possible to make a change of the shift range, and ends the processing.

In Step S115, the SBW controlling ECU 40 determines whether all of detection signals outputted from the shift range sensor 36 are OFF. As long as the shift range sensor 36 is normal, it is impossible that all the detection signals are OFF. Therefore, when all the detection signals are OFF, the SBW controlling ECU 40 determines that an abnormal condition is occurring, and advances the processing to Step S130. In the case of any other answer, the SBW controlling ECU 40 advances the processing to Step S120.

In Step S120, the SBW controlling ECU 40 determines whether two or more of detection signals outputted from the shift range sensor 36 are ON. As long as the shift range sensor 36 is normal, it is impossible that two or more detection signals are ON. Therefore, when two or more detection signals are ON, the SBW controlling ECU 40 determines that an abnormal condition is occurring, and advances the processing flow to Step S130. In the case of any other answer, the SBW controlling ECU 40 determines that the shift range sensor is normal, and advances the processing to Step S125.

In Step S125, the SBW controlling ECU 40 executes a shift range changing process which is to be performed in case of the shift range sensor 36 being normal. More specifically, the SBW controlling ECU 40 determines an actual shift range in accordance with detection signals detected by the shift range sensor 36 and feedback-controls the supply of an electric current to the electric motor 32 until the actual shift range and the instructed shift range become coincident with each other. As a result, the manual valve 24 moves to the position corresponding to the instructed shift range, whereby the instructed shift range is realized.

In Step S130, the SBW controlling ECU 40 executes a shift range changing process which is to be performed in case of the shift range sensor 36 being abnormal. This shift range changing process will be described below with reference to FIG. 1.

Figure 1:
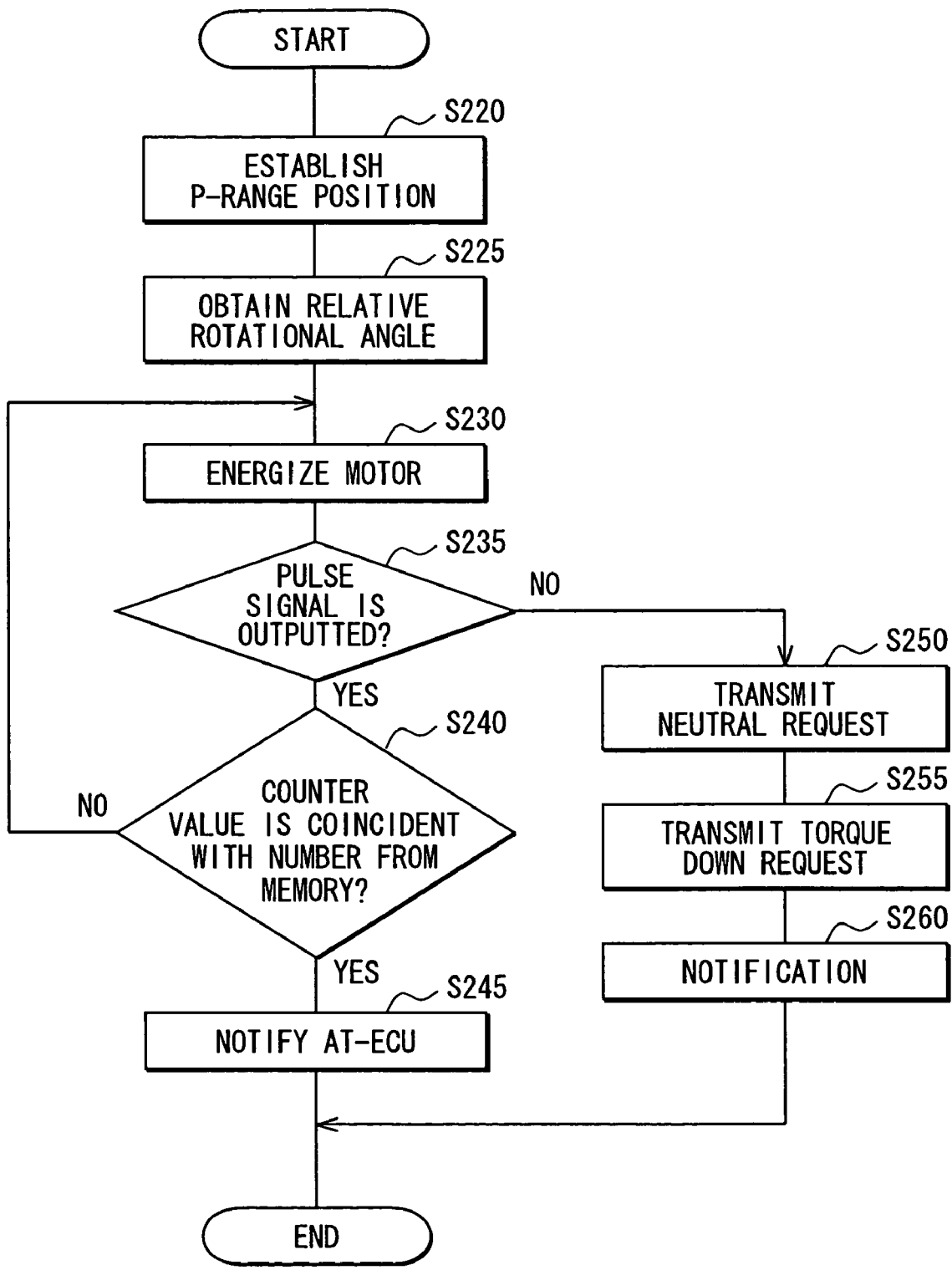
FIG. 1 is a flow chart related to a first embodiment of the present invention.

FIG. 1 is a flow chart showing a flow of the shift range changing process which is to be performed in case of the shift range sensor 36 being abnormal. In the case where the shift range sensor 36 is abnormal, an actual shift range is uncertain and therefore it is impossible to make a feedback control based on an actual shift range. In this case, the SBW controlling ECU 40 changes the shift range in accordance with the following flow chart.

In Step S220, the SBW controlling ECU 40 controls the electric motor 32 and makes the detent plate 72 rotate in the direction of B in FIG. 5 until the roller 74 comes into abutment against the P-wall 76. Upon abutment of the roller 74 against the P-wall 76, pulse signals provided from the rotational angle sensor 34 are interrupted. When the interruption of the pulse signals continues a certain time or longer, the SBW controlling ECU 40 determines that the roller 74 has come into abutment against the P-wall 76, and stops the supply of an electric current to the electric motor 32. Upon abutment of the roller 74 against the P-wall 76, the SBW controlling ECU 40 establishes the rotational angle of the output shaft 32a at that instant as a parking range position ("P-range position" hereinafter).

In Step S225, the SBW controlling ECU 40 acquires from the memory a relative rotational angle of the output shaft 32a necessary for switching from the P-range to the instructed shift range. As noted previously, the relative rotational angle is stored in the memory as the number of pulse signals provided from the rotational angle sensor 34.

In Step S230, the SBW controlling ECU 40 supplies an electric current to the electric motor 32 until a pulse signal is outputted from the rotational angle sensor 34.

In Step S235, the SBW controlling ECU 40 advances the processing to Step S240 when a pulse signal is outputted within a certain time, while when a pulse signal is not outputted even with the lapse of a certain time or longer, the SBW controlling ECU 40 determines that the rotational angle sensor 34 is abnormal, and advances the processing to Step S250.

In Step S240, the SBW controlling ECU 40 stops the supply of an electric current to the electric motor 32 and adds 1 to a pulse signal counter. When the counter value coincides with the number acquired from the memory, the SBW controlling ECU 40 advances the processing to Step S245, while when both are not coincident with each other, the SBW controlling ECU 40 returns the processing to Step S230 and repeats the processing. The supply of an electric current to the electric motor 32 is repeated until the counter value becomes coincident with the number acquired from the memory, whereby the manual valve 24 moves to the position corresponding to the instructed shift range to realize the instructed shift range.

In Step S245, the SBW controlling ECU 40 notifies the AT controlling ECU 25 that the change of the shift range has been completed.

In Step S250, the SBW controlling ECU 40 determines that it is impossible to make a change of the shift range, and transmits a neutral control request to the AT controlling ECU 25 to ensure the safety of the vehicle.

In Step S255, the SBW controlling ECU 40 sends a torque down request to the engine controlling ECU 41.

In Step S260, the SBW controlling ECU 40 controls the alarm device 80 to notify the vehicle occupant that it is impossible to make a change of the shift range, and ends the processing.

In the processing described above, as to Step S220, it may be executed only when the shift range sensor 36 is first determined to be abnormal, and may be omitted when a shift range changing command is issued subsequently. In the case where Step S220 is omitted, a relative rotational angle of the output shaft 32a necessary for the change not from the P-range but from the instructed shift range of last time to the instructed shift range of this time is acquired from the memory in Step S225.

According to the first embodiment of the present invention described above, when the shift range sensor 36 is determined to be abnormal from an abnormal condition of the detection signals provided from the shift range sensor 36, the manual valve 24 is moved until the movement thereof is inhibited by the P-wall 76, whereby the P-range position can be established. According to the first embodiment, moreover, operation quantities which represent relative rotational angles between shift ranges are stored in the memory. Therefore, once the P-range position can be established, all that is required is to rotate the output shaft 32a of the electric motor 32 by a relative rotational angle corresponding to an instructed shift range, whereby the manual valve 24 can be moved to the position corresponding to a shift range changing command. In this way it is possible to make a change to the shift range corresponding to the shift range changing command. Thus, according to the first embodiment, it is possible to make a change to the instructed shift range even when there occurs any abnormal condition in the shift range sensor 36.

In the first embodiment, once an abnormal condition of the shift range sensor 36 is determined, it is determined on the basis of a vehicular condition whether it is possible to change the shift range. Then, only when the answer is affirmative, the manual valve 24 is moved. Therefore, the position of one end of the reciprocative movement range can be established in a safer state.

Although reference has been made above to the case where the roller 74 is abutted against the P-wall 76 to establish the P-range position, there may be adopted a modification wherein the roller 74 is abutted against the D-wall 77 to establish the D-range position and a change is made to another shift range on the basis of the D-range position. The SBW controlling ECU 40 not only makes sure that the vehicle is at a standstill and that the brake is in operation, but also further enhances the safety by requests to the brake controlling ECU 61, AT controlling ECU 25, and engine controlling ECU 41. Therefore, even upon abutment of the roller 74 against the D-wall 77, there occurs no danger.

Second Embodiment

This second embodiment is a modification of the first embodiment. In this second embodiment, when a shift range changing command for changing to the D-range is outputted after the roller 74 is abutted against the P-wall 76 to establish the P-range position as in the first embodiment, the D-range is realized not by the amount of operation but by abutment of the roller 74 against the D-wall 77. In this second embodiment, the R and N-ranges are realized on the basis of the amount of operation as in the first embodiment.

Figure 6:
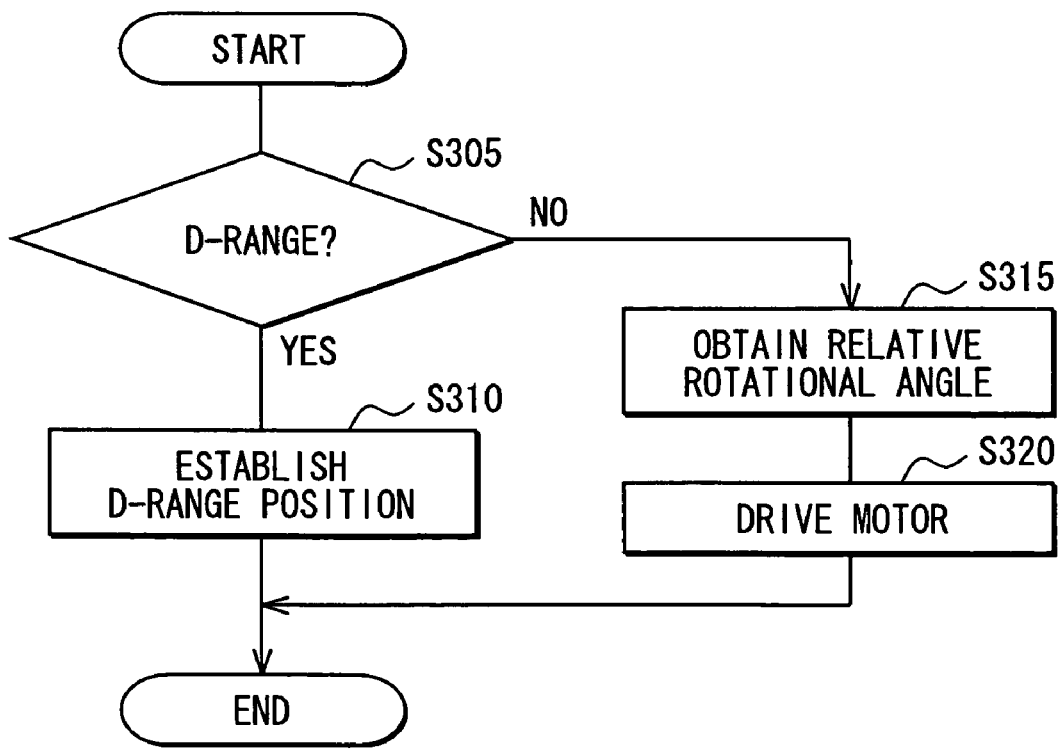
FIG. 6 is a flow chart related to a second embodiment of the present invention.

FIG. 6 is a flow chart showing a processing flow for realizing the D-range by abutment of the roller 74 against the D-wall 77. This processing is started upon output of a shift range changing command after the P-range position is established in the same way as in the first embodiment.

In Step S305, it is determined whether the shift range instructed by the shift range changing command is the D-range. When the answer is affirmative, the processing flow advances to Step S310, while when the shift range is other than the D-range, the processing flow advances to Step S315.

In Step S310, the SBW controlling ECU 40 makes the detent plate 72 rotate in the direction of arrow A until the roller 74 comes into abutment against the D-wall 77. In this way the D-range is realized. At this time, the SBW controlling ECU 40 establishes a relative position (D-range position) of the D-range with respect to the P-range position. More particularly, the D-range position is established as the number of pulse signals from the P-range position.

In Step S315, the SBW controlling ECU 40 acquires from the memory a relative rotational angle of the output shaft 32*a* necessary for making a change from the present actual shift range to the instructed shift range. As noted above, the relative rotational angle is stored in the memory as the number of pulse signals provided from the rotational angle sensor 34.

In Step S320, the SBW controlling ECU 40 realizes the instructed shift range in the same way as in the first embodiment.

The abutment of the roller 74 against the D-wall 77 is done only when a shift range changing command for change to the D-range is first outputted after the P-range has been established. When a shift range changing command for change to the D-range is outputted subsequently, the D-range is realized on the basis of a relative rotational angle between the actual shift range and the established D-range position.

It is likely that there may occur a discrepancy between the relative rotational angle stored as the amount of operation in the memory and the actual relative rotational angle due to, for example, wear of the recesses 75. According to the second embodiment, as to the D-range, the position thereof is established by abutment of the roller 74 against the D-wall 77 as is the case with the P-wall 76, whereby it is possible to make a change to the D-range more accurately.

Reference has been made above to the case where the roller 74 is brought into abutment against the D-wall 77 upon receipt of a shift range changing command for changing to the D-range after the P-range position has been established. Conversely, the roller 74 may be abutted against the P-wall 76 after the D-range position has been established and upon receipt of a shift range changing command for changing to the P-range.

Third Embodiment

According to this third embodiment, when the shift range sensor 36 is in an abnormal condition, P and D-range positions are established in a continuous manner.

Figure 7:
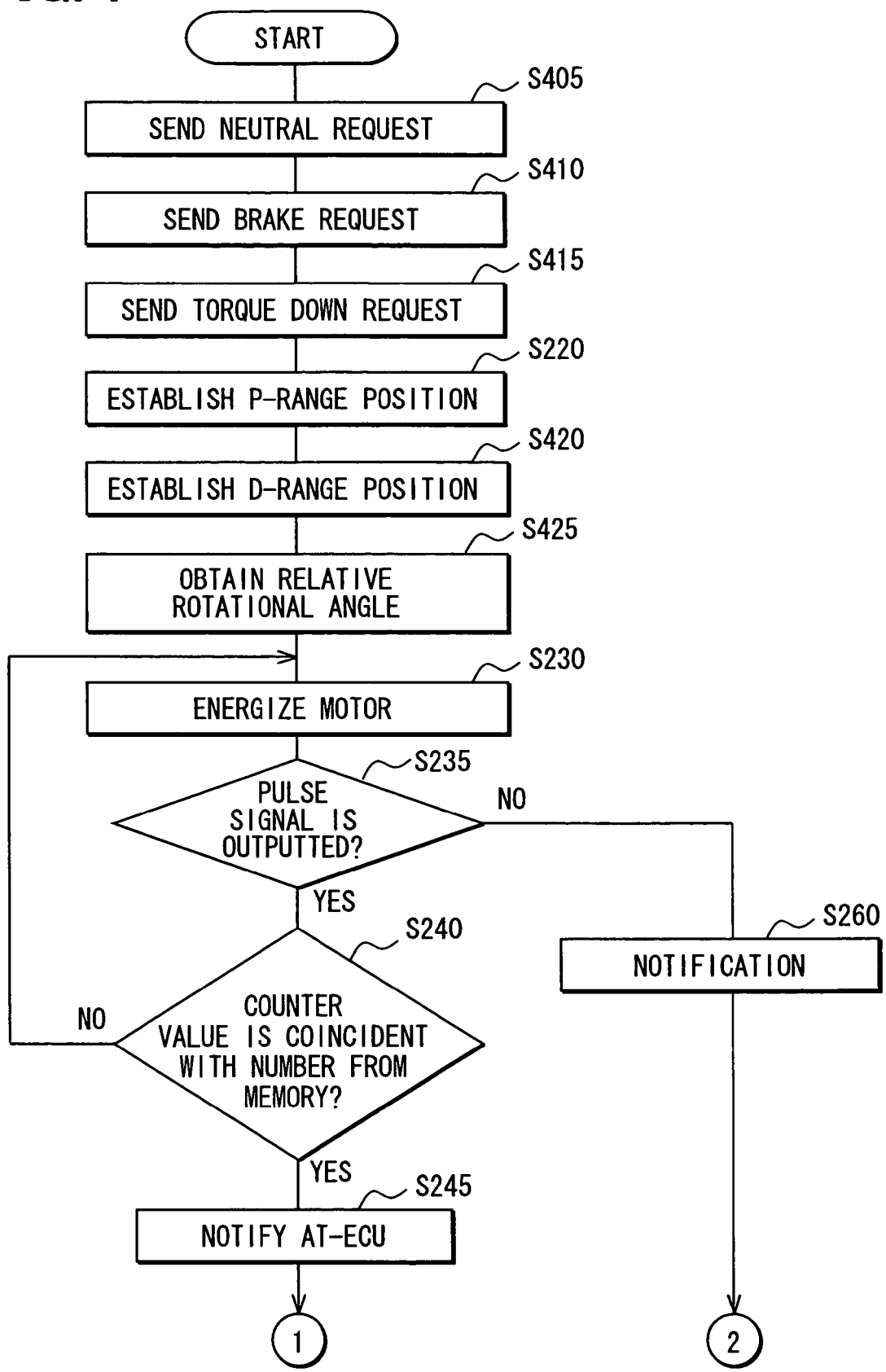
FIG. 7 is a flow chart related to a third embodiment of the present invention.
Figure 8:
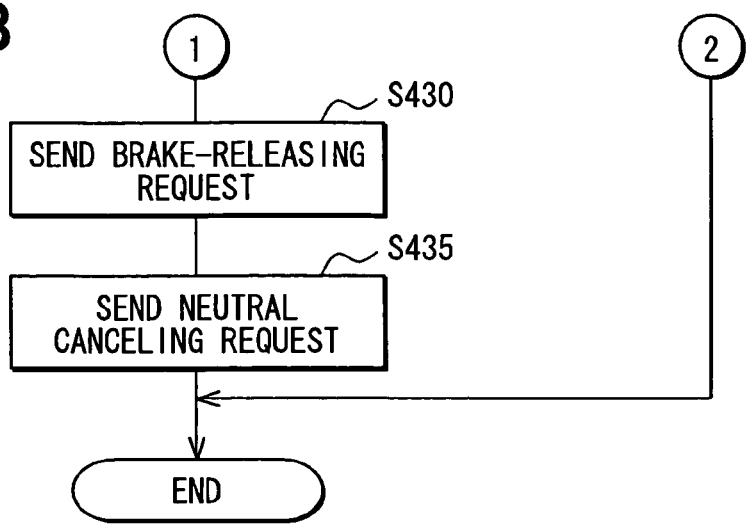
FIG. 8 is a flow chart related to the third embodiment of the present invention.

FIGS. 7 and 8 are flow charts showing the flow of a shift range changing process performed when the shift range sensor 36 related to the third embodiment is in an abnormal condition. This processing is executed upon output of a shift range changing command from the shift range selector 39. In this third embodiment, as to substantially the same steps as in the first embodiment, they are identified by the same reference numerals as in the first embodiment, and explanations thereof will be omitted.

In Step S405, the SBW controlling ECU 40 sends a neutral control request to the AT controlling ECU 25. Upon receipt of the neutral control request the AT controlling ECU 25 executes an N-range control and realizes the N-range. When the manual valve 24 is moved in a neutral condition of the automatic transmission 20, the vehicle can be maintained at a standstill even when a change is made to a travel range, and thus it is possible to ensure the safety of the vehicle in a more positive manner.

In Step S410, the SBW controlling ECU 40 sends a brake actuation request to the brake controlling ECU 61. Upon receipt of the brake actuation request the brake controlling ECU 61 controls the brake actuating device 62 to actuate the brake. When the manual valve 24 is moved in a state in which the brake is actuated and the vehicle is at a standstill, the vehicle can be maintained at a standstill positively even when a change is made to a travel range by moving the manual valve 24. Thus, the safety of the vehicle can be ensured more positively.

In Step S415, the SBW controlling ECU 40 sends a torque down request to the engine controlling ECU 41. Upon receipt of the torque down request the engine controlling ECU 41 controls the throttle device 51 and the fuel injection valve 52 to lower the engine torque. When the manual valve 24 is moved in a lowered state of the engine torque, the vehicle can be maintained at a standstill positively even when a change is made to a running range by moving the manual valve 24. Thus, the safety of the vehicle can be ensured more positively.

In Step S420, the SBW controlling ECU 40 makes the detent plate 72 rotate in the direction of arrow A in FIG. 5 until the roller 74 comes into abutment against the D-wall 77, whereby the D-range is realized. The SBW controlling ECU 40 stores in the memory the rotational angle of the output shaft 32*a* at this instant as the D-range position.

In Step S425, the SBW controlling ECU 40 acquires from the memory a relative rotational angle of the output shaft 32*a* necessary for changing from the D-range to an instructed shift range.

In Step S430, the SBW controlling ECU 40 sends a brake-releasing request to the brake controlling ECU 61. Upon receipt of the brake releasing request the brake controlling ECU 61 controls the brake-actuating device 62 to release the brake.

In Step S435, the SBW controlling ECU 40 sends a neutral control canceling request to the AT controlling ECU 25. Upon receipt of the neutral control canceling request the AT controlling ECU 25 controls the electromagnetic valves 23 to cancel the N-range control.

According to the third embodiment described above, P and D-range positions are established in a continuous manner, so that when the SBW controlling ECU 40 receives a shift range changing command, it is possible to make a change to the D-range immediately and accurately.

When the wall abutment is performed in a continuous manner and when the rise in oil pressure of the automatic transmission 20 is slow, the continuous abutment may be done before rising of the oil pressure without depending on the foregoing neutral control, brake operation, and lowering of the torque.

Although reference has been made above to the case where the roller 74 is abutted continuously against the D-wall 77 after abutted against the P-wall 76, the roller 74 may be abutted continuously against the P-wall 76 after abutted against the D-wall 77.

Fourth Embodiment

In this fourth embodiment, the state of the shift range sensor 36 is checked at certain time intervals irrespective of whether a shift range changing command is present or not, and as soon as it is determined that the shift range sensor 36 is in an abnormal condition, the P-range position is established.

Figure 9:
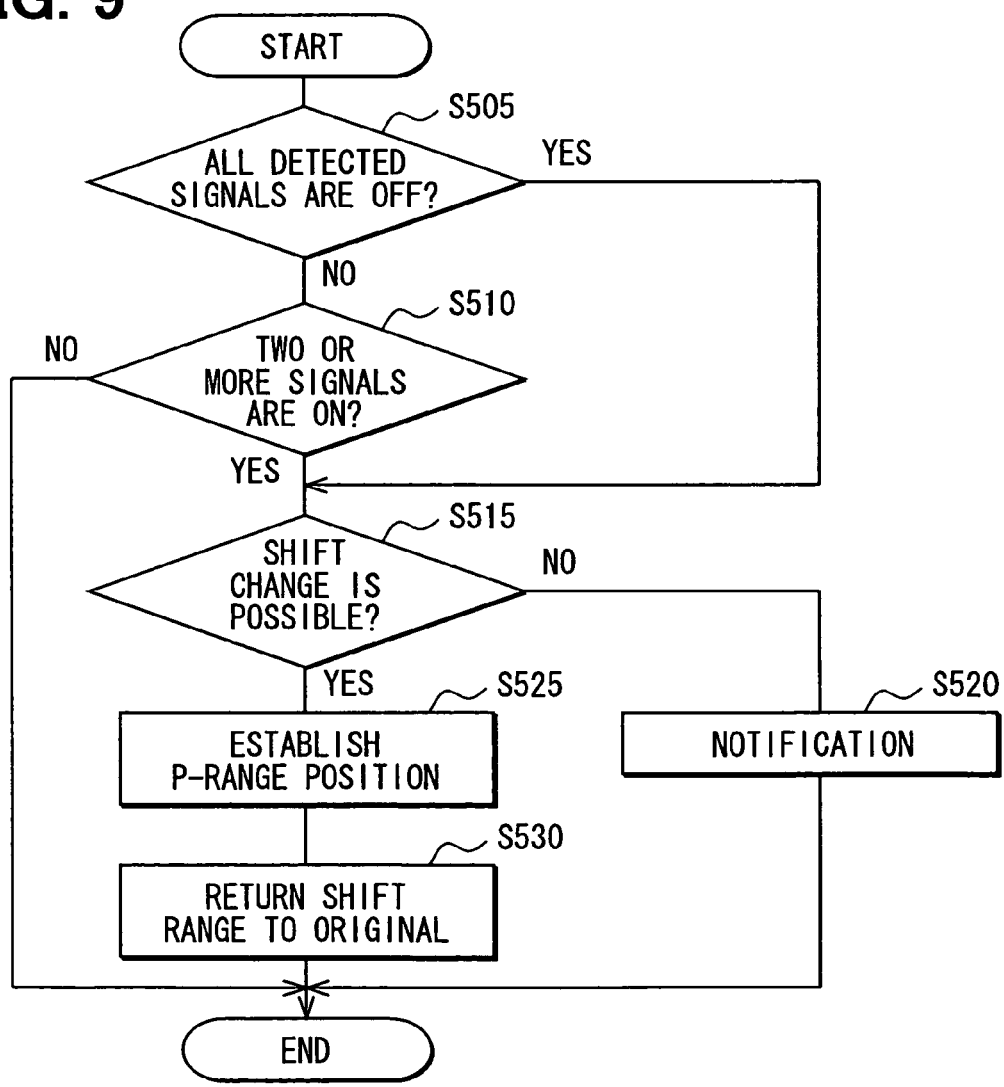
FIG. 9 is a flow chart related to a fourth embodiment of the present invention.

FIG. 9 is a flow chart showing the flow of a processing for establishing the P-range position. This processing is executed at certain time intervals without depending on whether a shift range changing command is present or not.

In Step S505, the SBW controlling ECU 40 determines whether all of detection signals outputted from the shift range sensor 36 are OFF. When all the detection signals are OFF, the SBW controlling ECU 40 advances the processing to Step S515, while in the case of any other answer, the SBW controlling ECU 40 advances the processing to Step S510.

In Step S510, the SBW controlling ECU 40 determines whether two or more of detection signals outputted from the shift range sensor 36 are ON. When the answer is affirmative, the SBW controlling ECU 40 determines that an abnormal condition is occurring, and advances the processing to Step S515, while in the case of any other answer, the SBW controlling ECU 40 ends the processing.

In Step S515, the SBW controlling ECU 40 determines whether it is possible to change the shift range in the same way as in Step S105. When the answer is affirmative, the SBW controlling ECU 40 advances the processing to Step S525, while when the answer is negative, the SBW controlling ECU 40 advances the processing to Step S520.

In Step S520, the SBW controlling ECU 40 controls the alarm device 80 to notify the vehicle occupant that it is impossible to change the shift range, and ends the processing.

In Step S525, the SBW controlling ECU 40 controls the electric motor 32 to make the detent plate 72 rotate in the direction of arrow B in FIG. 5 until the roller 74 comes into abutment against the P-wall 76, and establishes the P-range position. At this time, the SBW controlling ECU 40 counts the number of pulse signals outputted from the rotational angle sensor 34 during the period after rotation of the electric motor 32 until abutment of the roller 74 against the P-wall 76.

In Step S530, the electric motor 32 is rotated reversely by an amount corresponding to the number of pulse signals counted as above. As a result, the shift range returns to the original shift range as the shift range prior to rotation of the electric motor 32 in Step S525.

According to the SBW controlling ECU 40 in the fourth embodiment described above, once an abnormal condition of the shift range sensor 36 is detected, the P-range position is established without waiting for a shift range changing command. Therefore, upon receipt of a shift range changing command, it is possible to make a change to the instructed shift range. Besides, after the P-range position is established, the manual valve 24 is moved to the position corresponding to the original shift range, so that the vehicle occupant can perform operation without being conscious that the range has changed temporarily for establishing one end position.

Although in the fourth embodiment the manual valve 24 is moved to the position corresponding to the original shift range after establishing the P-range position, it is not always necessary to move the manual valve to the position corresponding to the original shift range. For example, the manual valve 24 may be moved to the position corresponding to a non-travel range such as P or N-range insofar as this is notified to the vehicle occupant beforehand by the alarm device 80. By moving the manual valve to the position corresponding to a non-travel range, it is possible to maintain the vehicle safe after establishing the position of one end.

Although the P-range position is established in the fourth embodiment, the D-range position may be established, or P and D-range positions may be established in a continuous manner.

Other Embodiments

Figure 10:
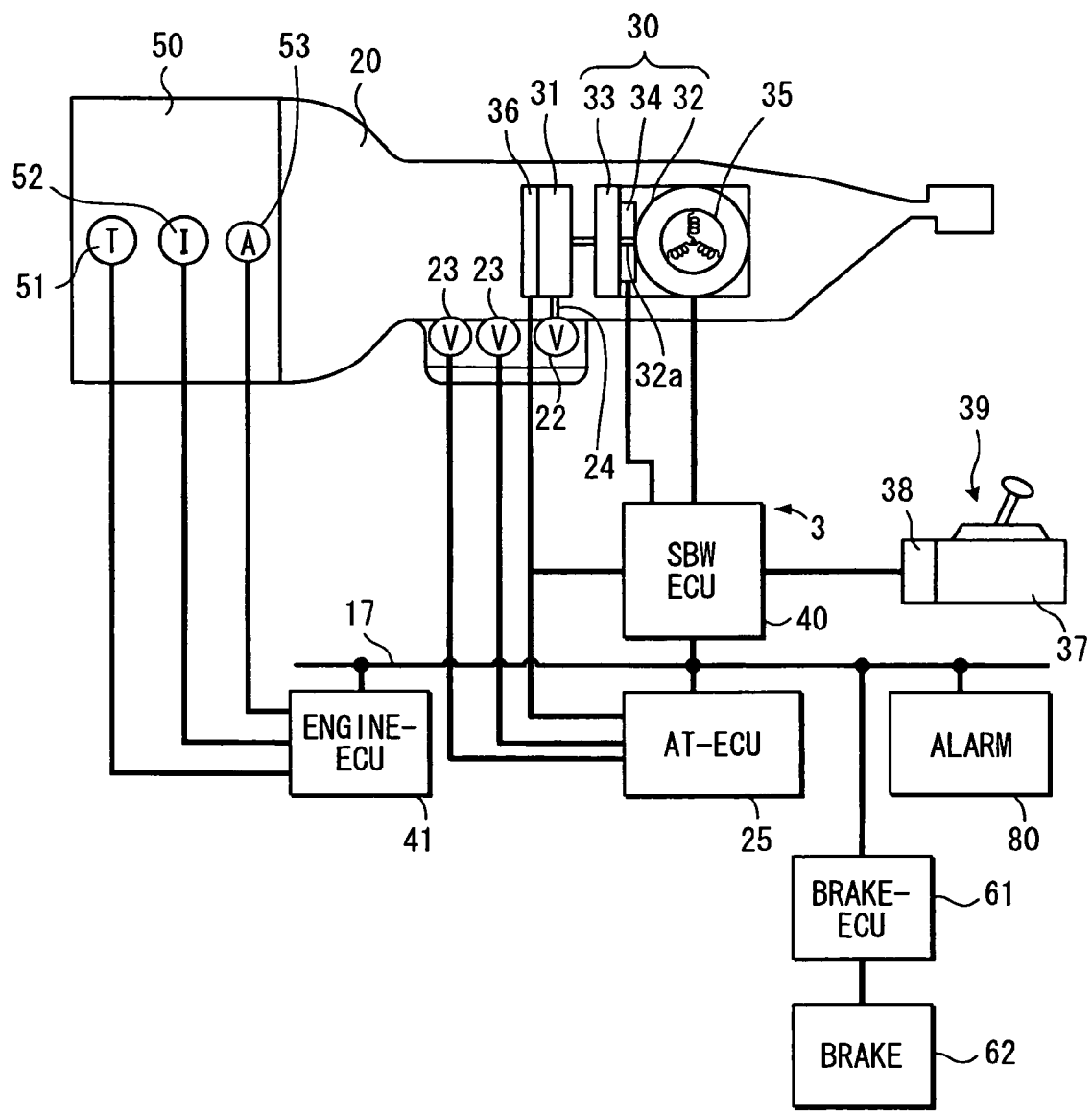
FIG. 10 is a schematic diagram of a vehicle system related to a further embodiment of the present invention.

Although in the above embodiments the detection signals provided from the shift range sensor 36 are outputted to only the SBW controlling ECU 40, there may be adopted such a construction as shown in FIG. 10 wherein the shift range sensor 36 and the AT controlling ECU 25 are connected together to output the detection signals also to the AT controlling ECU 25. In this case, the AT controlling ECU 25 determines an abnormal condition of the detection signals at certain time intervals as is the case with the SBW controlling ECU 40, then when such an abnormal condition is determined to be existent, it is first determined whether it is possible to change the shift range and thereafter the neutral control is executed. As a result, it is no longer necessary for the SBW controlling ECU 40 to send a neutral control request to the AT controlling ECU 25, whereby the processing of the SBW controlling ECU 40 can be simplified.

What is claimed is:

1. A vehicle control system comprising:
an actuator reciprocating a shift-changing valve which changes the shift range of the automatic transmission to a shift range corresponding to a movement position;
a restriction member adapted to restrict the movement of the shift-changing valve when the shift-changing valve moves to a terminal end of the reciprocative movement range;
a range detector for detecting the present shift range of the automatic transmission;
a controller which, when a shift range changing command instructing a change to an instructed shift range selected by a vehicle occupant is inputted, controls the actuator while making reference to detection signals detected by the range detector and moves the shift-changing valve to the position corresponding to the instructed shift range; and
a memory which stores, for each shift range interval, the amount of operation of the actuator performed when moving the shift-changing valve from a position corresponding to a certain shift range to a position corresponding to another shift range,
wherein the controller determines the state of the range detector on the basis of the detection signals detected by the range detector,
when the range detector is determined to be in an abnormal condition, the controller moves the shift-changing valve until the movement is restricted by the restriction member to define the position of the terminal end, and controls the actuator with respect to the defined terminal end position and on the basis of the amount of operation in order to move the shift-changing valve to the position corresponding to the instructed shift range.

2. A vehicle control system according to claim 1, further comprising a rotating member driven by the actuator, the rotating member rotating and transmitting a driving force of the actuator to the shift-changing valve, wherein the restriction member is adapted to come into abutment against the rotating member to restrict the rotation of the rotating member and the movement of the shift-changing valve.

3. A vehicle control system according to claim 1, wherein when the controller determines that the range detector is in an abnormal condition, the controller defines the position of the terminal end without waiting for input of the shift range changing command and thereafter moves the shift-changing valve to a position corresponding to the original shift range or a position corresponding to a non-travel range.

4. A vehicle control system according to claim 1, wherein the restriction member further restricts the movement of the shift-changing valve upon arrival of the shift-changing valve at the other end of the reciprocative movement range, and upon input of a shift range changing command instructing a change to the shift range corresponding to the other end after defining the position of the terminal end, the controller moves the shift-changing valve to define the position of the other end until the movement is restricted by the restriction member.

5. A vehicle control system according to claim 1, wherein the restriction member further restricts the movement of the shift-changing valve upon arrival of the shift-changing valve at the other end of the reciprocative movement range, and after defining the position of the terminal end, the controller further moves the shift-changing valve to establish the position of the other end until the movement is restricted by the restriction member.

6. A vehicle control system according to claim 5, wherein when the controller determines that the range detector is in an abnormal condition, the controller defines the position of the terminal end and that of the other end without waiting for input of the shift range changing command and thereafter moves the shift-changing valve to a position corresponding to the original shift range or a position corresponding to a non-travel range.

7. A vehicle control system according to claim 1, wherein the terminal end is a position at which the shift-changing valve changes the shift range of the automatic transmission to either a parking range or a forward range.

8. A vehicle control system according to claim 4, wherein the terminal end is a position at which the shift-changing valve changes the shift range of the automatic transmission to one of a parking range and a forward range, and the other end is a position at which the shift-changing valve changes the shift range of the automatic transmission to the other shift range.

9. A vehicle control system according to claim 1, wherein when the controller determines that the range detector is in an abnormal condition, the controller determines on the basis of the state of the vehicle whether it is possible to change the shift range, and only when it is possible to change the shift range, the controller moves the shift-changing valve to define the position of the terminal end.

10. A vehicle control system according to claim 9, wherein when the vehicle is at a standstill and a brake is in operation, the controller determines that it is possible to change the shift range.

11. A vehicle control system according to claim 10, wherein when moving the shift-changing valve for defining the position of the terminal end, the controller sends a brake actuation request to a brake controller which is for electrically controlling a vehicle brake actuating device, and moves the shift-changing valve in a state in which the brake is in operation and the vehicle is at a standstill.

12. A vehicle control system according to claim 10, wherein when moving the shift-changing valve for defining the position of the terminal end, the controller sends a request for control to a neutral state to an automatic transmission controller which can control the automatic transmission electrically into the neutral state, and moves the shift-changing valve in the neutral state of the automatic transmission.

13. A vehicle control system according to claim 10, wherein when moving the shift-changing valve for defining the position of the terminal end, the controller sends a request for lowering an engine torque to an engine controller which is for controlling an engine, and moves the shift-changing valve in a lowered state of the engine torque.

* * * * *